(12) United States Patent
Ujiie et al.

(10) Patent No.: US 9,426,417 B2
(45) Date of Patent: Aug. 23, 2016

(54) IMAGE PROCESSING DEVICE, DISPLAY TERMINAL, IMAGE DISPLAY SYSTEM, IMAGE PROCESSING METHOD, CONTROL METHOD OF DISPLAY TERMINAL, CONTROL METHOD OF IMAGE DISPLAY SYSTEM, AND PROGRAM THEREOF

(71) Applicants: Masahiro Ujiie, Tokyo (JP); Tsuyoshi Shigemasa, Tokyo (JP); Mikiko Abe, Tokyo (JP); Taro Okuyama, Tokyo (JP); Yoshinaga Kato, Kanagawa (JP); Takahiro Hiramatsu, Kanagawa (JP)

(72) Inventors: Masahiro Ujiie, Tokyo (JP); Tsuyoshi Shigemasa, Tokyo (JP); Mikiko Abe, Tokyo (JP); Taro Okuyama, Tokyo (JP); Yoshinaga Kato, Kanagawa (JP); Takahiro Hiramatsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/221,751

(22) Filed: Mar. 21, 2014

(65) Prior Publication Data
US 2014/0293000 A1 Oct. 2, 2014

(30) Foreign Application Priority Data
Mar. 26, 2013 (JP) .................................. 2013-064086

(51) Int. Cl.
*H04N 7/14* (2006.01)
(52) U.S. Cl.
CPC ............... *H04N 7/142* (2013.01); *H04N 7/141* (2013.01)

(58) Field of Classification Search
None
See application file for complete search history.

(56) References Cited

U.S. PATENT DOCUMENTS

| | | | |
|---|---|---|---|
| 8,570,434 B2 | 10/2013 | Odanaka et al. | |
| 2009/0160996 A1* | 6/2009 | Yamaoka | G06T 5/006 348/333.11 |
| 2010/0222107 A1* | 9/2010 | Wassingbo | H04N 1/00127 455/566 |
| 2012/0176508 A1* | 7/2012 | Jeong | H04N 5/2251 348/231.2 |
| 2013/0308055 A1 | 11/2013 | Shigemasa et al. | |
| 2014/0009628 A1* | 1/2014 | Jang | H04N 5/23222 348/207.1 |
| 2014/0033274 A1 | 1/2014 | Okuyama | |

FOREIGN PATENT DOCUMENTS

| | | |
|---|---|---|
| JP | 06-205412 A | 7/1994 |
| JP | 2012-151521 A | 8/2012 |
| JP | 2013-242357 A | 12/2013 |
| JP | 2014-027433 A | 2/2014 |

* cited by examiner

*Primary Examiner* — Maria El-Zoobi
(74) *Attorney, Agent, or Firm* — Oblon, McClelland, Maier & Neustadt, L.L.P.

(57) ABSTRACT

An image processing device includes an image control unit that controls an operation of imaging a picture image; a detection control unit that controls an operation of detecting whether a direction of imaging the picture image is changed or not; and a display control unit that controls an operation of displaying a display image which is generated based on the imaged picture image, and displays an image for setting when the detection control unit detects that the direction of imaging is changed.

8 Claims, 11 Drawing Sheets

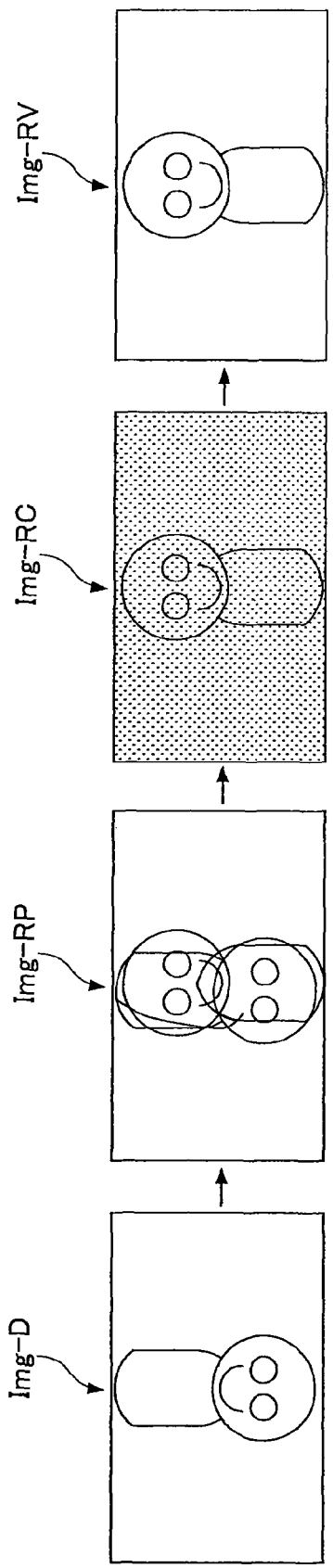

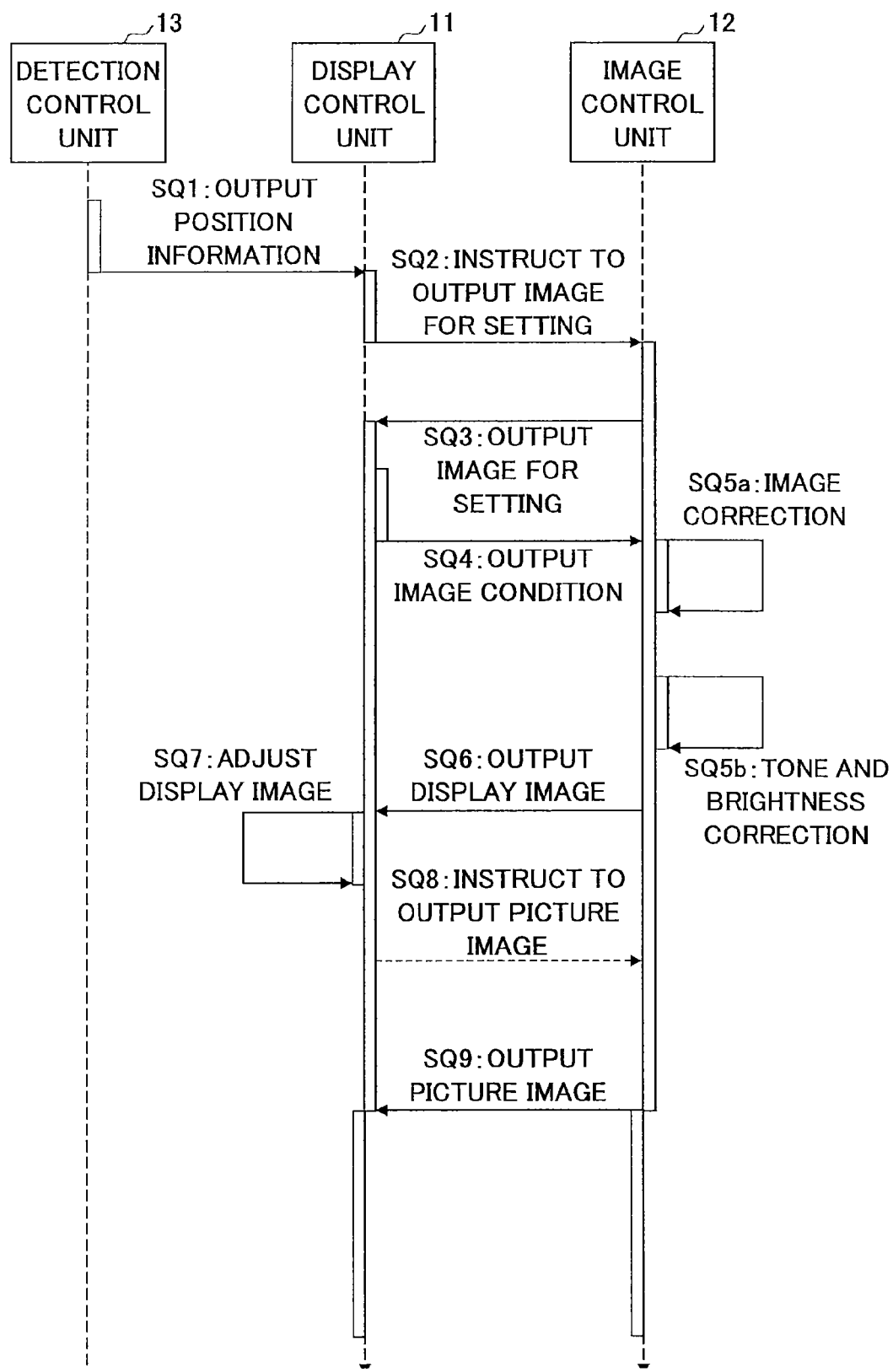

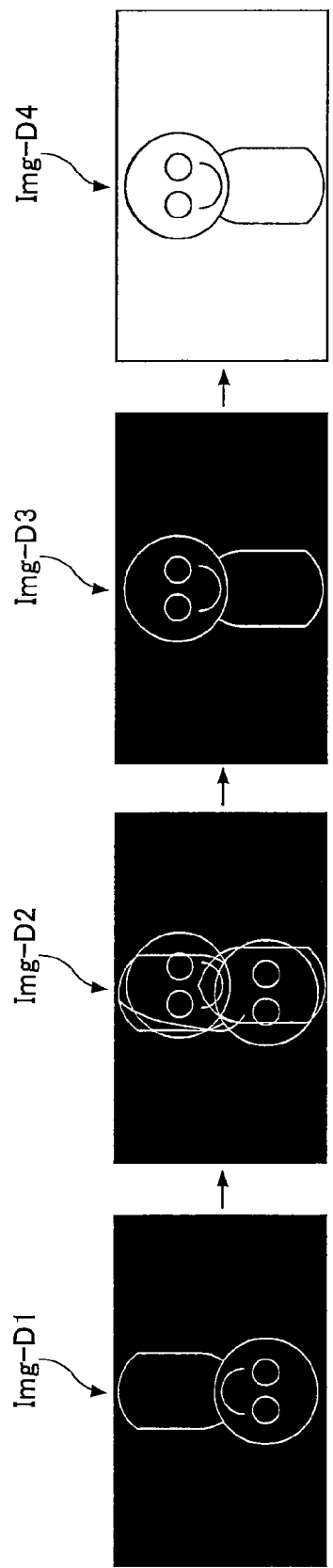

IMAGE PROCESSING DEVICE, DISPLAY TERMINAL, IMAGE DISPLAY SYSTEM, IMAGE PROCESSING METHOD, CONTROL METHOD OF DISPLAY TERMINAL, CONTROL METHOD OF IMAGE DISPLAY SYSTEM, AND PROGRAM THEREOF

BACKGROUND OF THE INVENTION

1. Field of the Invention

The disclosures herein generally relate to an image processing device, a display terminal, an image display system, an image processing method, a control method of the display terminal and a control method of the image display system.

2. Description of the Related Art

Some image display apparatuses image (record) an image (or video) and display the imaged images. Some image display apparatuses, for example, using plural display terminals which include (or connect) image units, send/receive an image (or a video) imaged by each of the plural display terminals bi-directionally and communicate.

Japanese Published Patent Application No. H6-205412 discloses a video conference system which synthesizes images output from plural cameras (image units), and displays on one display (display device).

However, in the video conference system disclosed in Japanese Patent Application No. H6-205412, when a position of the image unit is changed while the image is displayed, the image may not be displayed correctly. In the video conference system disclosed in Japanese Patent Application No. H6-205412, in the case of rotating the image unit to change a direction of the image, the displayed image may be flipped vertically. Moreover, in the video conference system disclosed in Japanese Patent Application No. H6-205412, a description cannot be found on detecting a change in the imaging direction of the image unit and displaying an image based on the detection result which was detected.

SUMMARY OF THE INVENTION

It is a general object of at least one embodiment of the present invention to provide an image processing device, a display terminal, an image display system, an image processing method, a control method of the display terminal or a control method of the image display system that substantially obviates one or more problems caused by the limitations and disadvantages of the related art.

In one embodiment, an image processing device includes an image control unit that controls an operation of imaging a picture image; a detection control unit that controls an operation of detecting whether a direction of imaging the picture image is changed or not; and a display control unit that controls an operation of displaying a display image which is generated based on the imaged picture image, and displays an image for setting when the detection control unit detects that the direction of imaging is changed.

In another embodiment, an image processing method includes an image control step of controlling an operation of imaging a picture image; a detection control step of controlling an operation of detecting whether a direction of imaging the picture image is changed or not; and a display control step of controlling an operation of displaying a display image which is generated based on the imaged picture image, and displaying an image for setting when the direction of imaging is detected to be changed.

According to the embodiments of the present invention, an image processing device, a display terminal, an image display system, an image processing method, a control method of the display terminal and a control method of the image display system which detect an imaging direction and control an operation of displaying an image are provided.

BRIEF DESCRIPTION OF THE DRAWINGS

Other objects and further features of embodiments will be apparent from the following detailed description when read in conjunction with the accompanying drawings, in which:

FIG. 2 is an explanatory diagram illustrating an example of a switching operation for a display image of the display terminal;

FIG. 3 is a schematic sequence diagram illustrating an example of an image processing device according to a first embodiment of the present invention;

FIG. 4 is an explanatory diagram illustrating an example of a result of image processing by the image processing device according to the first embodiment of the present invention;

DESCRIPTION OF THE PREFERRED EMBODIMENTS

Figure 1D:
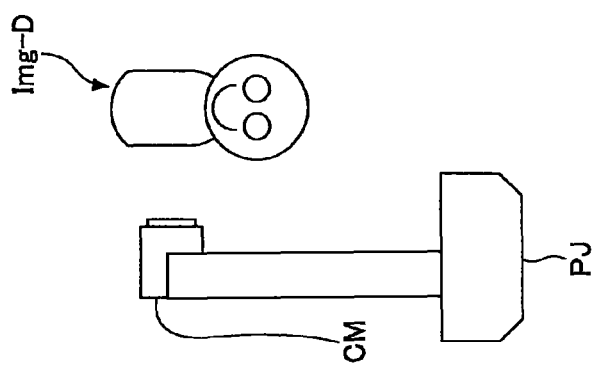
FIGS. 1A to 1D are explanatory diagrams illustrating an example of a display operation of a display terminal.
Figure 1C:
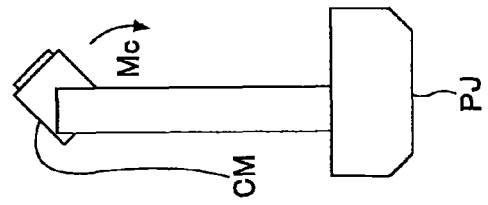
Figure 1B:
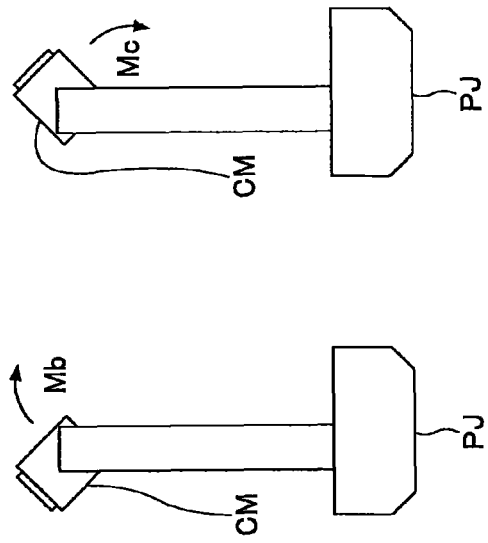
Figure 1A:
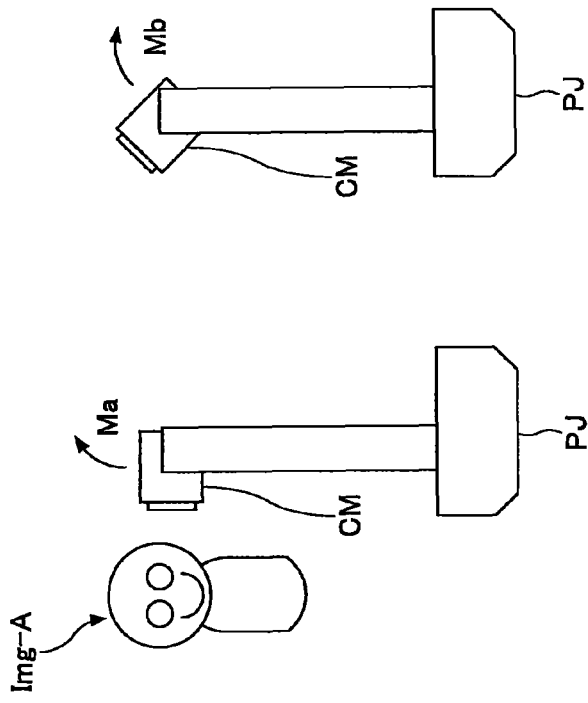

In the following, embodiments of the present invention will be described with reference to the accompanying drawings.

An unlimited exemplary embodiment of the present invention will be described using an image processing device, a display terminal or an image display system in which an image is imaged and an operation of displaying the imaged image is controlled. Meanwhile, in the descriptions, to the same or corresponding elements or parts described in all the attached drawings the same or corresponding reference numeral is assigned and duplicate explanation is omitted. Furthermore, the accompanying drawings do not aim at indicating a relative ratio between elements or parts. Accordingly, a specific size may be determined by a person skilled in the art in light of the descriptions in the unlimited embodiments in the following.

The present invention can be applied to any apparatus, device, unit, system or the like which includes an imaging unit and a display unit and can change the imaging direction of the imaging unit, even if it is not an image processing device or the like which will be described in the following.

The image in the present embodiment includes a still image, a moving picture, a video or the like. Changing the imaging direction is, as shown in FIGS. 1A to 1D, for example, changing a relative positional relationship between the camera CM and the base PJ including the display unit (Ma in FIG. 1A, Mb in FIG. 1B and Mc in FIG. 1C). Then, the display unit, for example, flips vertically the original image Img-D shown in FIG. 2 (Img-D in FIG. 1) to obtain Img-RP. The tone is adjusted (Img-RC), and the correct image is displayed (Img-RV).

The present invention will be explained in the order of the following list, using the image processing device, the display terminal, and the image display system according to the embodiments of the present invention.
1. A first embodiment (image processing device);
2. A second embodiment (display terminal);
3. A third embodiment (image display system);
4. Program and a recording medium; and
5. An example.

First Embodiment

Configuration of Image Processing Device

With reference to FIG. 3, the image processing device 10 according to the first embodiment of the present invention will be described. FIG. 3 is a schematic sequence diagram illustrating an example of the image processing device 10 according to the first embodiment.

As shown in FIG. 3, the image processing device 10 includes a display control unit 11 which controls an operation of displaying the display image; an image control unit 12 which controls an operation of imaging a picture image; and a detection control unit 13 which controls an operation of detecting the direction of imaging the picture image. Meanwhile, the image processing device 10 may further include an input/output unit that inputs/outputs information from/to outside the image processing device 10; and a storage unit that stores information on the operation of the image processing device 10.

The image processing device 10 controls an operation of displaying a picture image which a user images in a desired direction (position) and at a desired timing. The image processing device 10 controls an operation of displaying a display image, which is generated based on the imaged picture image using the display control unit 11, in the present embodiment. Moreover, the image processing device 10, using the image control unit 12, controls an operation of imaging the picture image. Furthermore, the image processing device 10, using the detection control unit 13, controls an operation of detecting whether the direction of imaging the picture image is changed or not.

The image processing device 10 (the display control unit 11, the image control unit 12, and the detection control unit 13) may, for example, using a program (control program, application or the like) stored in an integrated storage unit in advance, control the operation. Moreover, the image processing device 10 (the display control unit 11, the image control unit 12, and the detection control unit 13) may control the operation based on information input by the user's manipulation from the input/output unit. Furthermore, the image processing device 10 (the display control unit 11, the image control unit 12, and the detection control unit 13) may output information related to the control (operation information, process information, correction information or the like) using the input/output unit (manipulation unit or the like).

The display control unit 11 is a unit of controlling an operation of displaying the display image. The display control unit 11 controls an operation of an internal or external display unit which displays the display image (for example, the item 111 in FIG. 5, which will be described later). The display control unit 11 changes, for example, quality of the display image (tone, brightness, resolution or the like) to the specification corresponding to the display unit. Moreover, the display control unit 11 may perform a control of selecting a display image to be displayed from plural picture images, for example.

The display control unit 11 according to the present invention controls an operation of displaying on the display unit an image which is used for calibrating the display operation, such as a pattern image, which will be called as an "image for setting" in the following. Moreover, the display control unit 11 according to the present embodiment, for example, when the detection control unit 13, which will be described later, detects that the imaging direction is changed, displays the image for setting on the display unit.

The calibration in the present embodiment is reconfiguring the display operation when the display method for the display image (removing noise or disorder in the image, flipping the image vertically or horizontally, enlarging or reducing the image or trapezoidal correction, translating the position, or the like) or the specification of the display image (tone, brightness, resolution or the like) is changed. A timing when the image processing device 10 conducts the calibration includes, for example, at an initial setting time, at every startup, at a time of setting instruction by the user, at a time of input of setting instruction by a remote controller or the like, other than the time when the imaging direction is changed. Moreover, the image for setting is a mask image with black in a whole area or the like, an image of color bars, a test pattern, an image including characters and an image including information required for the calibration. Meanwhile, the operation at the calibration for the display image related to the display control unit 11 will be explained later in section "image processing method".

The image control unit 12 controls an operation of imaging the picture image. The image control unit 12 controls an operation of an image unit for imaging the image (for example, an item 112 in FIG. 5, which will be described later). The image control unit 12, for example, when the image unit images (obtains) the picture image (image data), forms an image of the picture image in the region to be imaged on an imaging element (image sensor), and controls an operation of acquiring pixel output signals of the imaging element as imaging data. That is, the image control unit 12 controls the operation of generating the display image based on the picture image (image data).

Moreover, the image control unit 12 controls the timing of imaging at a desired timing. Furthermore, the image control unit 12 outputs the picture image (image data) imaged by the image unit to the display control unit 11 as a display image.

The image control unit 12 according to the present invention, in the case of calibrating the display operation, outputs the image for setting to the display control unit 11. Meanwhile, the control of the image control unit 12, in the case of calibrating the display operation, may not be a control to output the image for setting and the display image to the display control unit 11. That is, the control of the display control unit 11, in the case of calibrating the display operation, may be a control to display an image which has been stored in the display control unit 11 in advance or may be a control not to display the image.

The operation at the calibration for the display image related to the image control unit 12 will be explained later in section "image processing method".

The detection control unit 13 controls an operation of detecting whether the imaging direction is changed or not. The detection control unit 13 controls an operation of a detection unit (for example, the item 113 in FIG. 5) which detects an angle, a position or the like of the image unit. The detection control unit 13 may detect, as the imaging direction, for example, a change in an angle between the display unit and the image unit. Moreover, the detection control unit 13 may detect, as the change in the imaging direction, for example, a translation (or rotational transfer) of the position of the image unit. Meanwhile, an example of the detection unit which the detection control unit 13 controls will be explained later in section "second example".

[Image Processing Method]

With reference to FIGS. 3 and 4, an image processing method of the image processing device 10 (operation of switching image when the image direction is changed) according to the first embodiment of the present invention will be explained. FIG. 4 is an explanatory diagram illustrating an example of operation of switching the display image by the image processing device 10 according to the present embodiment when the image direction is changed. Meanwhile, in the images Img-D1, Img-D2 and Img-D3 in FIG. 4, diagrams with white lines are shown for explanations, but the actually displayed image may be a mask image with black in the whole area.

As shown in FIG. 3, the image processing device 10 at the switching operation during the calibration (operation of switching the image in the case of changing the image direction), in sequence SQ1, the image direction of the image unit is changed (a change in direction, a movement of the position, or the like) by a user (operator or the like). Then, the image processing device 10 (the detection control unit 13) detects that the image direction is changed (detection control step). Moreover, the detection control unit 13 outputs "position information" to the display control unit 11. The change in the image direction may be a manual change or may be an automatic change by a function provided in the image processing device 10.

In sequence SQ2, the image processing device 10 inputs the "instruction to output the image for setting" into the image control unit 12 by using the display control unit 11. The display control unit 11 further outputs information on a predetermined time (for example, a duration time of outputting the mask image) related to the "output the image for setting". Next, in sequence SQ3, the image processing device 10, by using the image control unit 12, conducts the "output the image for setting" (image control step). The image control unit 12, as shown in FIG. 4, for example, sets the images for setting Img-D1, Img-D2 and Img-D3 (as an example, mask images with black in whole areas). Then, the user during a predetermined time, views a black screen which is masked.

The predetermined time may be a time according to a specification of the image processing device 10 (or the display unit), a communication state between the display control unit 11 (display unit) and the image control unit 12 (image unit) and/or a quality of a display image to be displayed. Moreover, the predetermined time may be determined experimentally or by numerical calculations in advance. Furthermore, the image processing device 10 (for example, an image processing device shown in the first example, which will be described later) may measure the predetermined time in advance.

Next, in sequence SQ4, the image processing device 10, by using the display control unit 11, conducts an "output of image condition" according to the specification of the display unit controlled by the display control unit 11 and a detection result detected by the detection unit which is controlled by the detection control unit 13. Then, in sequence SQ5a, the image processing device 10, by using the image control unit 12, conducts an image correction (correction corresponding to the detection result, for example, a horizontal or vertical flip, a translation of the position, an enlargement or a reduction, a trapezoidal correction or the like). Moreover, in sequence SQ5b, the image processing device 10, by using the image control unit 12, conducts a correction for quality of the image (correction corresponding to the specification of the display unit, for example, tone, brightness, resolution or the like) (image control step).

Next, in sequence SQ6, the image processing device 10, by using the image control unit 12, conducts an "output of display image". Then, in sequence SQ7, the image processing device 10, by using the display control unit 11, displays the corrected display image input in sequence SQ6 (display control step). Moreover, the image processing device 10, by using the display control unit 11, reconfigures an operation of the display unit on which the corrected display image is displayed (display control step). The display control unit 11 may detect that a preparation for displaying the corrected display image on the display unit is completed by using a polling process, an event process or the like.

Next, in sequence SQ8, the image processing device 10, by using the display control unit 11, inputs an "instruction to output picture image" into the image control unit 12. Then, in sequence SQ9, the image processing device 10, by using the image control unit 12, controls an image operation of the image unit and outputs a picture image imaged by the image unit to the display control unit 11 (display unit) as a display image (image control step). That is, the image processing device 10 releases the display of the image for setting.

Accordingly, the image processing device 10 (display control unit 11) ends the operation (or control of the operation) of switching the display image (picture image). The display control unit 11, as shown in FIG. 4, for example, can display the picture image Img-D4. That is, according to the image processing device 10, since at the switching operation for the images during the change in the image direction, the image for setting (for example, the mask image with black in the whole area) can be displayed, an image during switching display images is prevented from being viewed by a user. According to the image processing device 10, for example, an image including noise or disorder or an image during processing is prevented from being viewed by the user.

Second Embodiment

Configuration of Display Terminal

Figure 5:
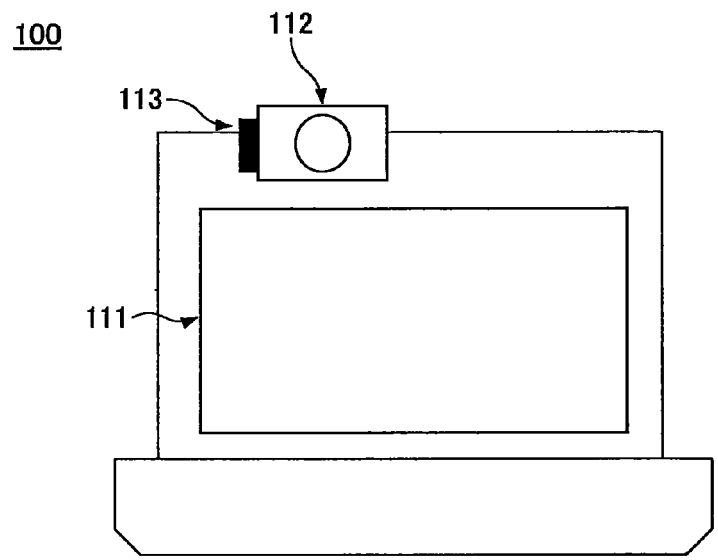
FIG. 5 is a schematic front view illustrating an example of a display terminal according to a second embodiment of the present invention.
Figure 6:
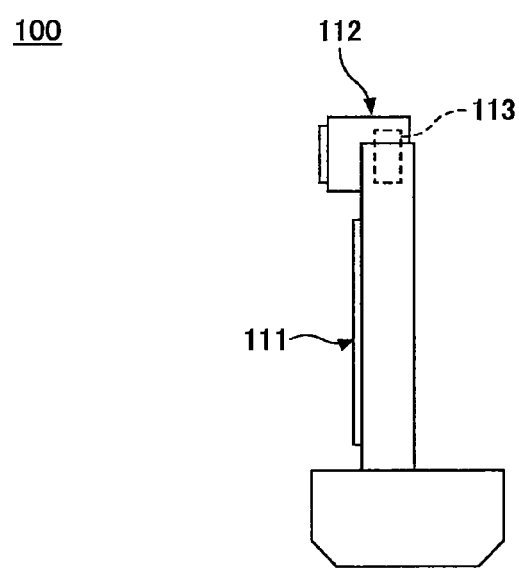
FIG. 6 is a schematic side view illustrating the example of the display terminal according to the second embodiment of the present invention.

With reference to FIGS. 5 and 6, a display terminal 100 according to a second embodiment of the present invention will be explained. FIG. 5 is a schematic front view illustrating an example of a display terminal 100 according to the present embodiment. FIG. 6 is a schematic side view illustrating an example of the display terminal 100. Meanwhile, an appearance of the display terminal 100 to which the present invention can be applied is not limited to those shown in FIGS. 5 and 6. For example, the display terminal may be that shown in FIG. 9, which will be described later in the second embodiment.

As shown in FIGS. 5 and 6, the display terminal 100 includes a display unit 111 that displays a display image, an image unit 112 that images a picture image, and a detection unit 113 that detects an image direction. Furthermore, the display terminal 100 may include an input/output unit (not shown) that inputs/outputs information from/to outside the display terminal 100 and a storage unit that stores information related to an operation of the display terminal 100.

An operation of displaying in the display unit 111 of the display terminal 100 according to the present embodiment is controlled by the display control unit 11 (See FIG. 3) of the image processing device 10 according to the first embodiment. An operation of imaging in the image unit 112 of the display terminal 100 according to the present embodiment is controlled by the image control unit 12 of the image processing device 10 according to the first embodiment. An operation of detecting in the detection unit 113 of the display terminal 100 according to the present embodiment is controlled by the detection control unit 13 of the image processing device 10 according to the first embodiment. Meanwhile, the display unit 111, the image unit 112 and the detection unit 113 may include (for example, incorporate) the display control unit 11, the image control unit 12 and the detection control unit 13, respectively.

The display terminal 100 displays a picture image imaged by the user in the desired direction (position) and at the desired timing as a display image. The display terminal 100, in the present embodiment, by using the display unit 111, displays the picture image (display image) imaged by the image unit 112. Moreover, display terminal 100, by using the detection unit 113, detects whether the direction of imaging the picture image is changed. The change in the direction of imaging the picture image includes a manual change by the user and an automatic change by a function provided in the display terminal 100.

Moreover, the display terminal 100 may control the operations of the display unit 111, the image unit 112 and the detection unit 113 based on, for example, information input from the input/output unit (user's manipulation) or the like. Moreover, the display terminal 100, for example, by using the input/output unit (operation unit, display unit or the like), may output information related to the state of the terminal (operation information, processing information, correction information or the like).

Meanwhile, the method of controlling the operation of the display terminal 100 (the display unit 111, the image unit 112 and the detection unit 113) by the display control unit 11, the image control unit 12 and the detection control unit 13 is the same as that in the case of the image processing system 10 according to the first embodiment as above, and an explanation will be omitted.

The display unit 111 is a unit that displays the display image. The display unit 111 displays a picture image imaged by the image unit 112 as a display image. For the display unit 111, a liquid crystal display, an organic electro luminescence (EL) or a touch panel, or, a general purpose PC, a smartphone, a mobile camera, a tablet type terminal, a dedicated terminal in a video conference system, the display part of an image (video) of a digital still camera or a video camera may be used. Moreover, in the display unit 111 according to the present embodiment, the specification (tone, brightness, resolution or the like) of a display image may be adjusted by the user, for example. Moreover, the display unit 111 may display one or plural picture images of plural picture images input from plural image units 112, for example.

To the display unit 111 according to the present invention, an image for setting (an image used for calibrating the display operation) is input from the image unit 112 (image control unit 12). Moreover, the display unit 111 according to the present invention, in response to the control by the display control unit 11, displays the image for setting which is input for a predetermined time.

The image unit 112 is a unit that images a picture image. The image unit 112 images an image and inputs the picture image imaged by the image unit 112 into the display unit 111 as a display image. For the image unit 112, a camera, a digital camera, a video camera, a stereo camera, a general purpose PC, a smartphone, a mobile phone, a tablet type terminal, a picture imaging unit (or a movie imaging unit) of dedicated terminals or the like in a video conference system or the like may be used. Moreover, the operation of imaging in the image unit 112 may be controlled at a desired timing by a user. Moreover, the display terminal 100 may include plural image units 112. Furthermore, the display terminal 100 may use an external image apparatus as the image unit 112.

The image unit 112 according to the present invention, in the case of calibrating the display operation, in response to the control by the image control unit 12, inputs an image for setting to the display unit 111. Moreover, the image unit 112 according to the present invention, inputs the image for setting based on information on the predetermined time (displaying time for the image for setting) input from the display control unit 11 (display unit 111).

The detection unit 113 detects whether the image direction by the image unit 112 is changed or not. The detection unit 113, as the image direction, for example, may detect a change in an angle between the display unit 111 and the image unit 112. Moreover, the detection unit 113, as a change in the image direction, for example, may detect a movement of the position of the image unit 112. For the detection unit 113, for example, an angle sensor or a position sensor, which detects an angle, a position or the like, may be used. Meanwhile, an example of the detection unit 113 will be explained later in "Second example".

The input/output unit inputs/outputs information (for example, an electric signal) from/to outside the display terminal 100. The input/output unit may include a manipulation part (user interface) manipulated by the user, and an input/output part (computer interface) through which information is input/output from/to the PC or the like. Moreover, the input/output unit may have a configuration where a display condition and an image condition are input by a user who uses the display terminal 100. Furthermore, the input/output unit may have a configuration where information of an operation condition and an operation state is output to the user who uses the display terminal 100.

The storage unit is a unit that stores information related to the operation of the display terminal 100. The storage unit stores information related to a process status during the operation of the display terminal 100 and a process status under suspension (waiting). For the storage unit, publicly known related art can be used.

[Method of Controlling Display Terminal]

With reference to FIGS. 5 and 6, the method of controlling the display terminal 100 according to the second embodiment of the present invention (operation of switching images when the image direction is changed) will be explained. Meanwhile, the method of controlling the display terminal 100 according to the present embodiment includes the image processing method of the image processing device 10 according to the first embodiment, and the difference between them will be mainly explained in the following.

As shown in FIG. 5, the display terminal 100 according to the present embodiment is provided with the image unit 112 in an upper part the display terminal. As shown in FIG. 6, in the display terminal 100, the image unit 112 is rotated by a user at a desired timing and at a desired position (Mc) (See FIG. 9). Then, the display terminal 100, by using the detection unit 113 (detection control unit 13), detects that the image direction of the image unit 112 is changed (detection step). The detection unit 113 may detect, for example, the angle of the image unit 112.

In the case where the detection unit 113 detects that the image direction of the image unit 112 is changed, the display terminal 100 outputs information on a position detected by the detection unit 113 to the display unit 111 (display control unit 11). Then, the display unit 111 (display control unit 11) inputs an instruction to output an image for setting to the image unit 112 (image control unit 12). Moreover, the display unit 111 (display control unit 11) further inputs information on the predetermined time, which has been preliminarily set.

According to the above feature, the image unit 112 (image control unit 12) outputs the image for setting to the display unit 111 (display control unit 11) based on the instruction to output the image for setting which has been input (image step). Moreover, the image unit 112 (image control unit 12), based on the information on the predetermined time which has been input, continues the output of the image for setting to the display unit 111 (display control unit 11).

As a result, the display terminal 100, by using the display unit 111 (display control unit 11), displays the image for setting which has been input (display step). That is, according to the display terminal 100, an image when the display image is switched (for example, an image including noise or disorder, an image during processing or the like) is prevented from being viewed by the user, and the image for setting is displayed. Moreover, according to the display terminal 100, during the operation of switching a display image, the image for setting is displayed, and when the operation of switching the display image is completed, the display of the image for setting is released.

Third Embodiment

Configuration of Image Display System

Figure 7:
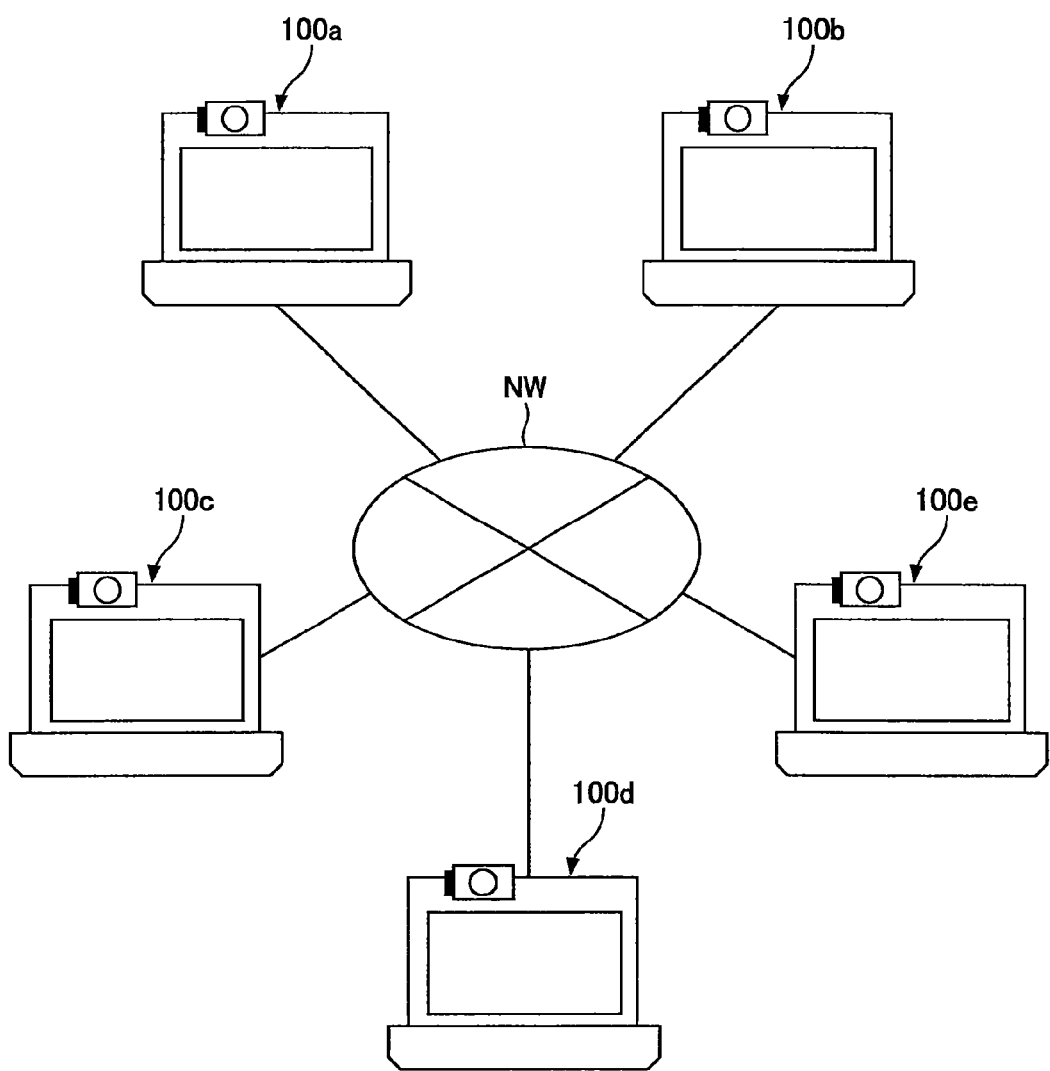
FIG. 7 is a schematic system diagram illustrating an example of an image display system according to a third embodiment of the present invention.

With reference to FIG. 7, an image display system 100S according to the third embodiment of the present invention will be explained. FIG. 7 is a schematic system diagram illustrating an example of the image display system 100S according to the present embodiment. Meanwhile, an image display system to which the present invention can be applied is not limited to that shown in FIG. 7.

As shown in FIG. 7, the image display system 100S includes plural display terminals 100a, 100b, 100c, 100d and 100e (corresponding to the display terminal 100 according to the second embodiment). Moreover, the image display system 100S, by using wired or wireless networks (so-called network, cloud computing or the like) NW, sends/receives bidirectionally a picture image imaged by each of the plural display terminals (100a or the like). That is, the image display system 100S displays one picture image which was imaged by one display terminal (image unit) on the other display terminals (display units). The image display system 100S displays an other picture image which was imaged by an other display terminal (image unit) on the one display terminal (display unit). Meanwhile, a configuration or the like of each display terminal is the same as the configuration or the like of the display terminal 100 according to the second embodiment, and an explanation will be omitted.

[Method of Controlling Image Display System]

The method of controlling the image display system 100S according to the third embodiment of the present invention (operation of switching image when the image direction is changed) will be explained. Meanwhile, the method of controlling the image display system 100S according to the present embodiment includes the method of controlling the display terminal 100 according to the second embodiment, and the difference between them will be mainly explained in the following.

As shown in FIG. 7, the image display system 100S, by using the plural display terminals (100a or the like), images plural picture images (image step). Moreover, the image display system 100S, by using the plural display terminals (100a or the like), displays plural picture images (display step). That is, in the image display system 100S, plural users share information by using the plural display terminals.

In the image display system 100S, at one or more display terminals of the plural display terminals (100a or the like) the image direction of the image unit 112 (See FIG. 6) is changed at the user's desired timing and at the desired position. Then, the image display system 100S, by using the detection unit 113 (See FIG. 6), detects that the image direction of the image unit 112 is changed (detection step). Moreover, the image display system 100S, by using the display unit 111 (and the image unit 112), displays an image for setting on the display terminal displaying a picture image by the image unit, the image direction of which is changed (display step, image step). That is, the image display system 100S, when the image direction is changed, switches the display image which has been displayed to the image for setting, at first.

Next, the image display system 100S continues for a predetermined time displaying the image for setting. In the image display system 100S according to the present embodiment, the predetermined time may be set by further adding a time required for communicating information between the display terminals.

The image display system 100S, for the predetermined time, performs a configuration correction necessary for correctly displaying a picture image after the switching. The image display system 100S, for example, removes noise or disorder in the image, flips the image vertically or horizontally, enlarges or reduces the image, makes trapezoidal correction, or the like. Moreover, the image display system 100S, for the predetermined time, may reconfigure a display condition (tone, brightness or the like) of the display terminal displaying the picture image, the image direction of which is changed.

As a result, the image display system 100S can switch a display image without making the image when the display image is switched (for example, an image including noise or disorder or an image during processing or the like) viewed by the user. Moreover, since the image display system 100S can keep the image from being viewed by the user when the display image is switched, the user is prevented from getting uncomfortable by viewing the image when the display image is switched. Furthermore, the image display system 100S can conduct the switching of the display image, without making the image be displayed on a display terminal on the other end of the communication when the display image is switched. Meanwhile, the image display system 100S can be applied to a video conference system or a remote conference system.

[Program and Recording Medium Storing Program]

A program Pr according to the present embodiment, when executed performs an image processing method which controls an operation of displaying an imaged picture image. The method includes an image control step for controlling an operation of imaging the picture image; a display control step for controlling an operation of displaying a display image which is generated based on the imaged picture image; and a detection control step for controlling an operation of detecting whether a direction of imaging the picture image is changed or not. When the detection control step detects that the direction of imaging is changed, the display control step displays an image for setting. According to the program Pr, the same effect as that of the image processing device 10 according to the first embodiment of the present invention is obtained.

Moreover, the program Pr according to the present invention includes executing a control method of a display terminal including the image processing method as above. The detection control step includes a detection step for detecting whether the direction of imaging the picture image is changed or not. When the detection control step detects that the direction of imaging is changed, the image control step includes an image step for outputting the image for setting as the picture image. The display control step includes a display step for displaying the image for setting as the display image. According to the program Pr, the same effect as that of the display terminal 100 according to the second embodiment of the present invention is obtained.

Moreover, the program Pr according to the present invention includes executing a control method of an image display system including the control method of a display terminal as above. The image step, using plural of the display terminals, images the picture images, respectively. The detection step, using the display terminals, detects whether the directions of imaging are changed or not. The display step sends/receives the imaged picture images by wire/wirelessly and bidirectionally, and displays them. According to the program Pr, the same effect as the image display system 100S according to the third embodiment of the present invention is obtained.

Meanwhile, the present embodiment may include a recording medium Md readable by a computer which stores the program Pr as above. For the recording medium Md which stores the program Pr, a flexible disk (FD), a CD-ROM (Compact Disk-Read Only Memory), a CD-R (CD Recordable), a DVD (Digital Versatile Disk), a semiconductor memory such as a flash memory, a RAM (Random Access Memory), a ROM (Read Only Memory), a memory card, a HDD (Hard Disk Drive) and other media readable by a computer can be used.

Meanwhile, the recording medium Md storing the program Pr, is assumed to include a volatile memory temporarily storing the program, inside the computer system which becomes a server or a client when the program is sent via a network. The network includes a network such as the Internet and a communication line such as a phone line. Moreover, the volatile memory is, for example, DRAM (Dynamic Random Access Memory). Furthermore, the program Pr recorded on the recording medium Md, as above, may be a so-called difference file which realizes a function by combining with the program already stored in the computer system.

EXAMPLE

The present embodiment will be explained using an image processing device or a display terminal according to an Example.

First Example

The present embodiment will be explained using the image processing device 20 according to the first example of the present embodiment.

[Configuration of Image Processing Device]

Figure 8:
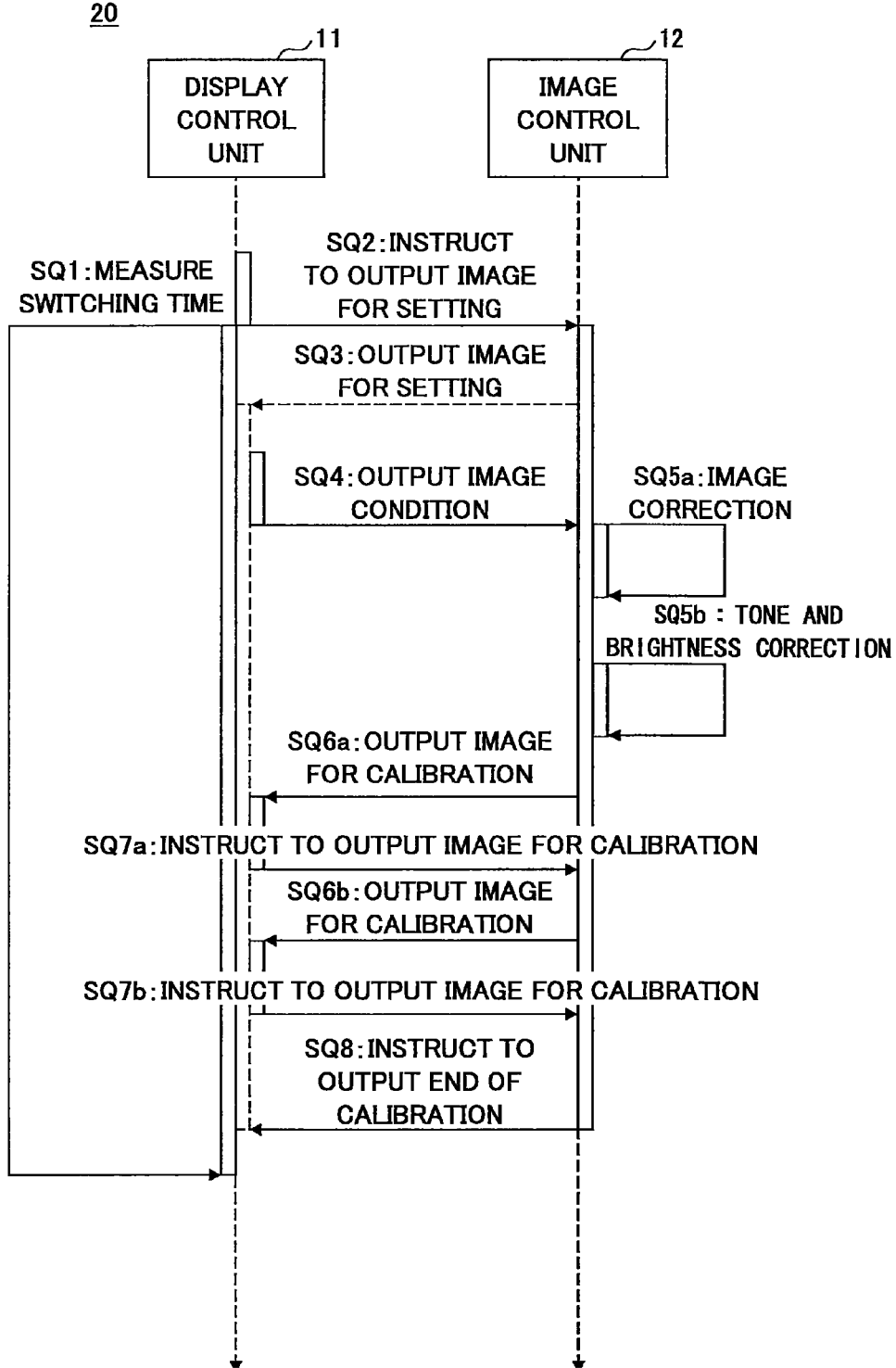
FIG. 8 is a schematic sequence diagram illustrating an example of an image processing device according to a first example of the present invention.

By using FIG. 8, the image processing device 20 according to the present example will be explained. FIG. 8 is a schematic sequence diagram illustrating an example of the image processing device 20 according to the present example.

As shown in FIG. 8, the image processing device 20 includes, as in the image processing device 10 according to the first embodiment, a display control unit 11 that controls an operation of displaying a display image, and an image control unit 12 that controls an operation of imaging a picture image. Moreover, the image processing device 20 further includes a detection control unit (not shown) that controls an operation of detecting the imaging direction.

The display control unit 11 in the image processing device 20 according to the present example measures a switching time (time required for switching the display image). That is, the display control unit 11, preliminary measures a switching time corresponding to an arbitrary status of use (condition of use of the display terminal or the image display system), by performing the operation of switching a display image, for example, at the time of startup or an initial setting time of the image processing device 20 (display terminal image display system). Moreover, the display control unit 11 according to the present example, at the operation of switching a display image when the image direction is changed, uses the switching time which has been preliminarily measured as a predetermined time.

Meanwhile, the operation of measuring the switching time (the predetermined time) by the image processing system 20 (display control unit 11) will be explained later in section "image processing method".

Other configurations of the display control unit 11, the image control unit 12 and the detection control unit of the image processing device 20 according to the present example are the same as those in the display control unit 11 or the like of the image processing device 10 according to the first embodiment, and an explanation will be omitted.

[Image Processing Method]

By using FIG. 8, the image processing method (operation of measuring the switching time) of the image processing device 20 according to the first example of the present embodiment will be explained. Meanwhile, the method of measuring the switching time (predetermined time) by the image processing device according to the present embodiment is not limited to the example as described below. The image processing device according to the present embodiment may input the switching time (predetermined time) provided by the user, for example.

As shown in FIG. 8, the image processing device 20, in sequence SQ1, by using the display control unit 11, a measurement (count) of time starts in order to measure the switching time. The display control unit 11 starts the measurement (count) of time, for example, at the time of startup or an initial setting time of the image processing device 20, when a calibration button (not shown) is depressed by the user, or the like. Then, in sequence SQ2, the image processing device 20, at the same time as the start of the measurement, by using the display control unit 11, inputs an "instruction to output an image for setting" to the image control unit 12.

Next, in sequence SQ3, the image processing device 20, by using the image control unit 12, conducts an "output of the image for setting". The image control unit 12, as shown in FIG. 4, can output, for example, the image for setting, Img-D1, Img-D2 and Img-D3 (a mask image with black in the whole area).

Next, in sequence SQ4, the image processing device 20, by using the display control unit 11, conducts an "output of image condition" according to the specification of the display unit 111. Then, in sequence SQ5a, the image processing device 20, by using the image control unit 12, performs an image correction (for example, a horizontal or vertical flip, a translation of the position, an enlargement or a reducing, a trapezoidal correction or the like). Moreover, in sequence SQ5b, the image processing device 20, by using the image control unit 12, conducts a correction for quality of the image (correction corresponding to the specification of the display unit, for example, tone, brightness, resolution or the like).

Next, in sequence SQ6a and in sequence SQ7a, the image processing device, by using the image correction unit 12, conducts an "output of an image for calibration", and displays the image for calibration on the display unit 111. For the image for calibration, a color bar for adjusting the tone, an image of a test pattern, an image for adjusting brightness or resolution, or an image including other information required for calibration, may be used.

Moreover, in sequence SQ6b and sequence SQ7b, by using a different image for calibration, the same operation as in the sequence SQ6a and the sequence SQ7a may be conducted.

Next, in sequence SQ8, the image processing device 20, in the case where the display control unit 11 has input an instruction to output an end of calibration, finishes the measurement of the switching time and stores the measured time into the storage unit (not shown).

As described above, according to the image processing device 20 of the first example of the present embodiment, the same effect as the image processing device 10 according to the first embodiment can be obtained.

Moreover, according to the image processing device 20 according to the first example of the present embodiment, the switching time can be measured (counted). Moreover, according to the image processing device 20, since the switching time can be measured, at the operation of switching an image in the case where the image direction of the image unit 12 is changed, by using the measured time as the predetermined time, the operation of switching the image can be conducted. According to the image processing device 20, for example, by using the shortest time (switching time) measured according to the status of use of the image processing device 20, the operation of switching the image can be conducted.

Second Example

The present embodiment will be explained using a display terminal 200 according to a second example of the present embodiment. Meanwhile, a display terminal to which the present embodiment can be applied is not limited to the following example. The display terminal may be, for example, a general-purpose PC, a smartphone, a mobile phone, a tablet-type terminal, a dedicated terminal for a video conference system, a digital camera or a video camera.

[Configuration of Display Terminal]

Figure 9:
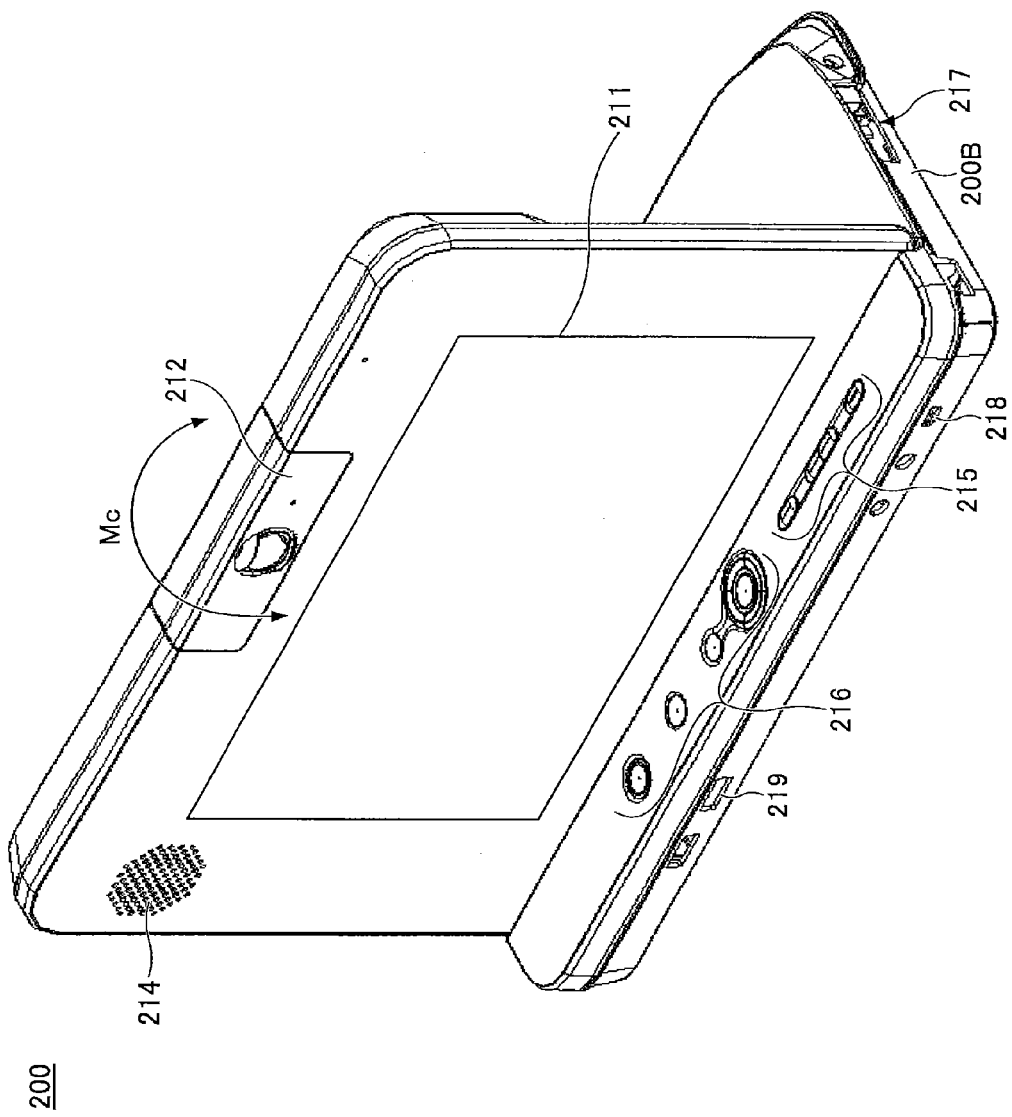
FIG. 9 is a schematic external view illustrating an example of a display terminal according to a second example of the present invention.
Figure 10A:
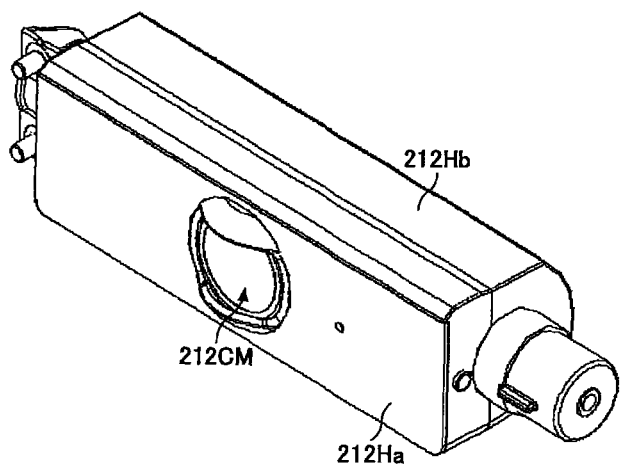
FIGS. 10A and 10B are schematic external views illustrating an example of an imaging unit of the display terminal according to the second example of the present invention.
Figure 10B:
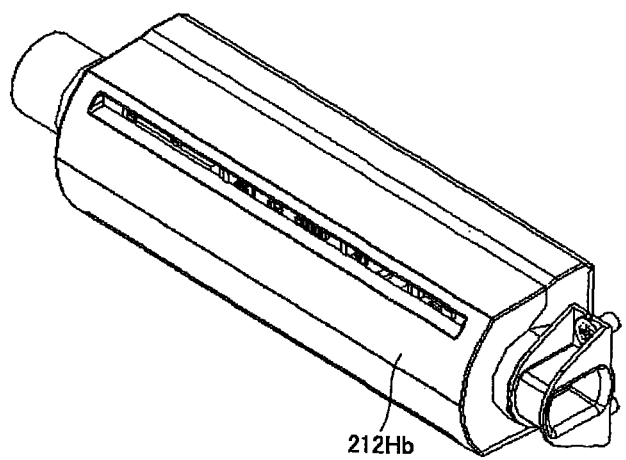
Figure 11:
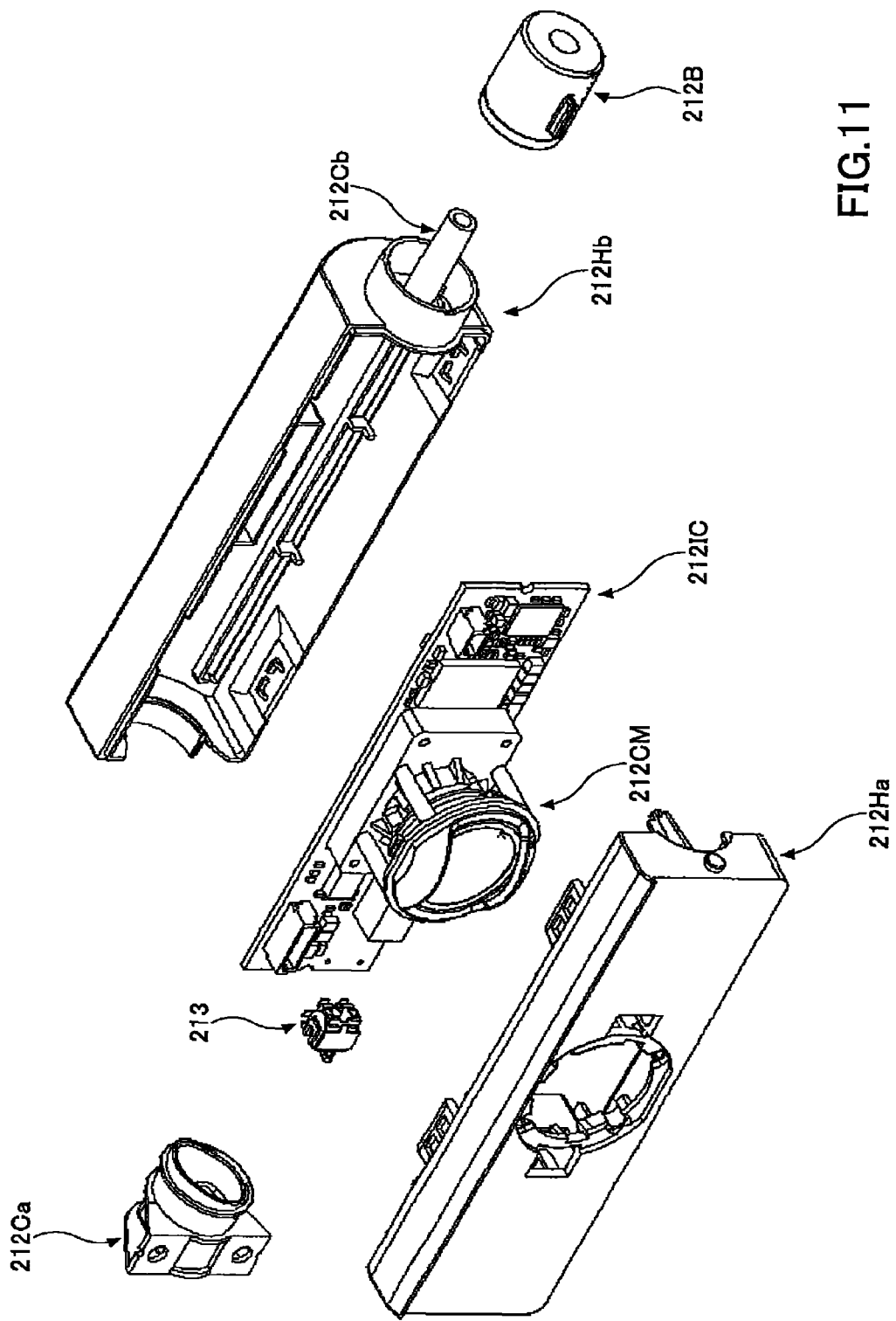
FIG. 11 is a schematic exploded view illustrating an example of the imaging unit of the display terminal according to the second example of the present invention.

The display terminal 200 according to the present example will be explained using FIGS. 9 to 11. FIG. 9 is a schematic external view illustrating an example of the display terminal 200 according to the present example. FIGS. 10A and 10B are schematic external views illustrating an example of an image unit 212 of the display terminal 200 according to the present example. FIG. 11 is a schematic exploded view illustrating an example of the image unit 212 of the display terminal 200 according to the present example. Meanwhile, the display terminal to which the present embodiment can be applied is not limited to that shown in FIGS. 9 to 11.

As shown in FIG. 9, the display terminal 200 includes a display unit 211 (LCD (Liquid Crystal Display) panel) that displays a display image, an image unit 212 that is attached rotatably to an upper part of the display unit 211, and a detection unit 213 (See FIG. 11) that is arranged inside the image unit 212. To the display terminal 200, a region including the display unit 211 and the image unit 212 and a chassis 200B are connected via a hinge. That is, to the display terminal 200, the region including the display unit 211 and the image unit 212 is connected rotatably by zero degrees to about 90 degrees with respect to the chassis 200B.

Moreover, the display terminal 200 according to the present example includes a sound pickup/emission unit 214 that picks up and/or emits sound or the like, plural manipulation buttons, a power switch, a configuration switch, a selection switch and a calibration switch 216. Meanwhile, the display terminal 200 may not be provided with the sound pickup/emission unit 214. That is, the display terminal 200 may have a configuration that uses an outside (external) microphone and a speaker.

Furthermore, the display terminal 200 includes a connection part 217 for a power-supply cable on a side of the chassis 200B, an external device connection part 218 (USB terminal, audio terminal or the like) on a upper side edge portion of the chassis 200B, and a display connection unit 219 (RGB connector or the like) on a front side of the chassis 200B.

As shown in FIGS. 10 and 11, the image unit 212 of the display terminal 200 has an image part 212CM inside a front side housing 212Ha and a rear side housing 212Hb. The image part 212CM is installed in an aperture at an approximate center of the front side housing 212Ha.

As shown in FIG. 11, in the image unit 212 of the display terminal 200, the image part 212CM is connected to a substrate 212IC provided with an image element. Moreover, the image unit 212 is attached rotatably by 180 degrees in the direction of Mc, shown in FIG. 9, according to attach portions 212Ca and 212Cb on both ends of the rear side housing 212Hb.

As shown in FIG. 11, the detection unit 213 of the display terminal 200 is electrically connected to the substrate 212IC, and has a configuration of being rotated with a rotation of the substrate 212IC (the image unit 212). The detection unit 213 according to the present example, by being rotated with the rotation of the substrate 212IC (image unit 212), is ON/OFF switched by a cam (not shown) arranged in the attach portion 212Ca, and outputs an ON/OFF signal. That is, the detection unit 213 detects a rotational position (zero degrees or 180 degrees) of the image unit 212 as the ON/OFF signal. Meanwhile, the detection unit 213 may have a configuration in which an angle sensor is arranged, for example, in the attach portion 212Cb to detect an angle of the image unit 212.

[Function of Display Terminal]

Figure 12:
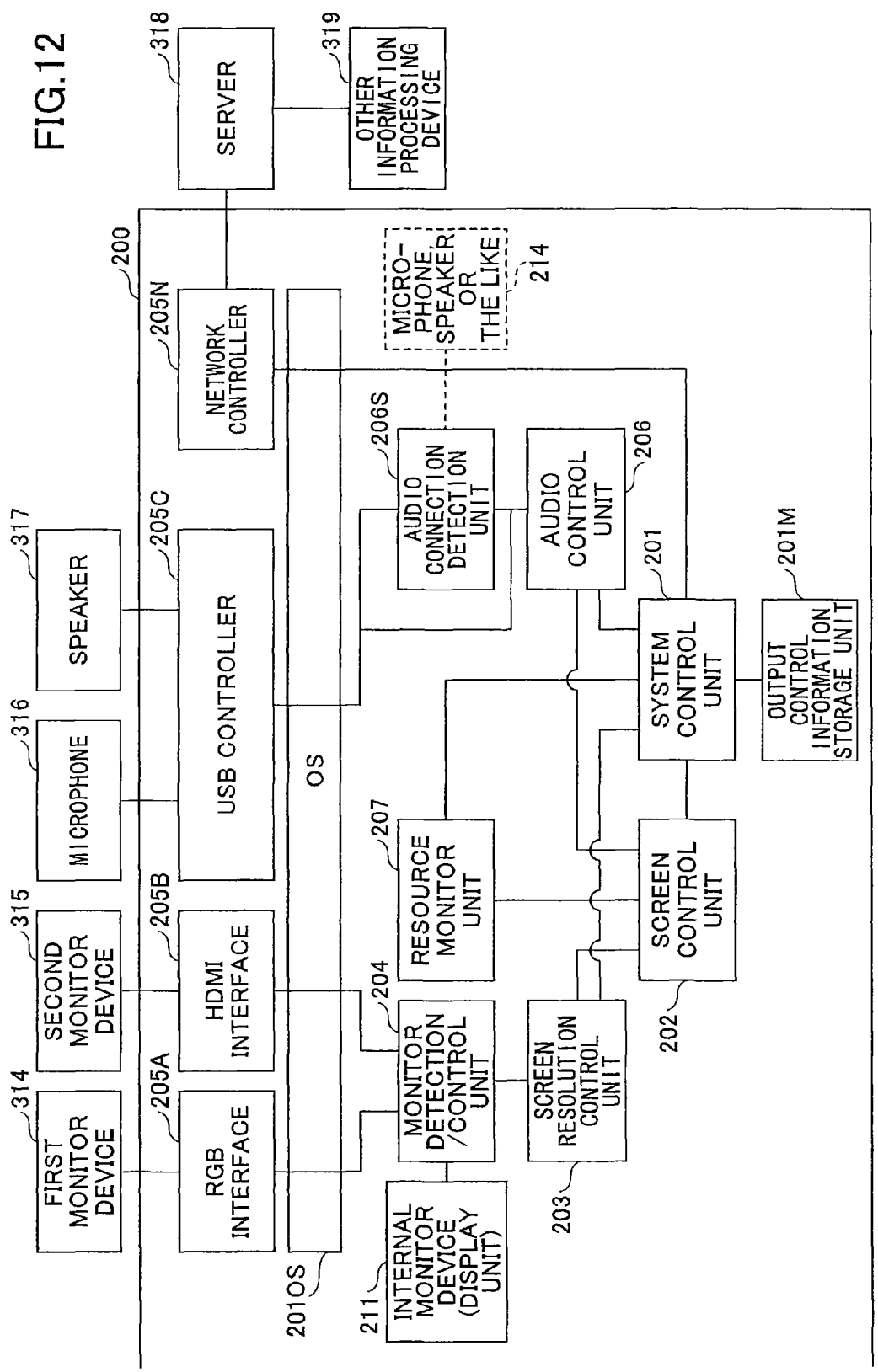
FIG. 12 is a functional block diagram illustrating an example of a function of the display terminal according to the second example.

A function of the display terminal 200 according to the present example will be explained using FIG. 12. FIG. 12 is a functional block diagram illustrating an example of the function of the display terminal 200 according to the present example. Meanwhile, a function of the display device to which the present embodiment can be applied is not limited to the following example.

As shown in FIG. 12, the display terminal 200 according to the present example is connected to a server 318 which transfers data to an other information processing device (or a display terminal) 319. Moreover, the display terminal 200 is connected to an external input/output apparatus (in the present example, a first monitor device 314, a second monitor device 315, a microphone 316 and a speaker 317) via an RGB interface 205A, an HDMI (High Definition Multimedia Interface) interface 205B, and a USB controller 205C. Meanwhile, the display terminal 200 may have a configuration where the RGB interface 205A or the like is not provided and may also have a configuration in which the display terminal 200 is not connected to the external input/output apparatus. That is, the display terminal 200, as shown in FIG. 9, may display an image imaged by the image unit 212 only on the display unit 211.

The RGB interface 205A is an interface that drives the first monitor device (for example, an LCD display) 314. The HDMI interface 205B is an interface that drives the second monitor device implemented as a large monitor. The USB controller 205C is a controller that performs data transmission/reception to/from the microphone 316 and the speaker 317. Meanwhile, the display terminal 200 may be implemented additionally or alternatively with an interface of a format such as XGA (eXtended Graphics Array), SXGA (Super-eXtended Graphics Array) or the like.

A network controller 205N is a controller that performs data communications between the display terminal 200, and the server 318 and the other information processing device 319. The network controller 205N uses, for example, Ethernet (registered trademark) or a communication protocol of IEEE 802.11, and makes communication according to the network protocol such as TCP/IP or UDP/IP, for example, possible.

The display terminal 200 picks up sound by using the microphone 316 or a built-in microphone (the sound pickup/emission unit 214), and forwards the sound to the other information processing device 319 via the server 318. Moreover, the display terminal 200 receives sound data picked up by the other information processing apparatus 319 from the server 318, and emits sound using the speaker 317 or the built-in speaker (the sound pickup/emission unit 214 in FIG. 9). That is, the display terminal 200 and the information processing apparatus (display terminal) 319 share the sound.

Moreover, the display terminal 200 includes a monitor detection/control unit 204 and a resource monitor unit 207, and an audio connection detection unit 206S.

The monitor detection/control unit 204 outputs an image to the internal monitor device (display unit 211 in FIG. 9), and controls an operation of the internal monitor device. Moreover, the monitor detection/control unit 204 detects whether the external first monitor device 314 and the second monitor device 315 are connected or not. The monitor detection/control unit 204, when it is detected that the external first monitor device 314 or the like is connected, acquires performance information, a name of product, a name of device or the like, and outputs a detection result to an audio control unit 206.

Furthermore, the display terminal 200 includes a screen resolution control unit 203, the audio control unit 206, a screen control unit 202 and a system control unit 201.

The screen resolution control unit 203 determines resolution information of a monitor based on a specification of the internal monitor device (display unit 211), and outputs the determined resolution information to the system control unit 201. The system control unit 201 generates image information based on the input resolution information, and outputs the generated image information to the screen control unit 202. The screen control unit 202 outputs the input image information to the screen resolution control unit 203. The screen resolution control unit 203 displays the image on the internal monitor device (display unit 211) based on the input image information, via the monitor detection/control unit 204.

Moreover, the screen resolution control unit 203 determines resolution information of a monitor (the first monitor device 314 or the like) based on the detection result input from the monitor detection/control unit 206S, and outputs the determined resolution information to the system control unit 201. The system control unit 201 outputs the image information generated based on the input resolution information to the screen control unit 202. The screen control unit 202 and the screen resolution control unit 203 control the monitor detection/control unit 204 based on the input image information, and display an image on the first monitor device 314 or the second monitor device 315 via an OS 201OS and the RGB interface 205A or HDMI interface 205B.

The audio control unit 206 controls the microphone, the speaker or the like (the sound pickup/emission unit 214) based on an input/output level determined by the system control unit 201. Moreover, the audio control unit 206 outputs the detection result input from the audio connection control unit 206S to the system control unit 201. The system control unit 201 determines the input/output level of the connected speaker (external speaker 317) based on the input detection result, and outputs the determined input/output level to the audio control unit 206.

The display terminal 200, in order to perform a control of the screen resolution and a control of an audio environment, stores output control information (image information, a control program or the like) in an output control information storage unit (for example a non-volatile memory) 201M, such as an NVRAM (Non-Volatile Random Access Memory), an EEPROM (Electrically Erasable Programmable Read-Only Memory), an EPROM (Erasable Programmable Read-Only Memory), or a flash memory. The system control unit 201, by using the output control information, controls the screen control unit 202, the screen resolution control unit 203, the audio control unit 206, the network controller 205N or the like.

[Method of Controlling Display Terminal]

The method of controlling the display terminal 200 according to the second example of the present embodiment is the same as the method of controlling the display terminal 100 according to the second embodiment, and an explanation will be omitted.

As described above, according to the display terminal 200 of the second example of the present embodiment, the same effect as that of the display terminal 100 of the second embodiment can be obtained.

Further, the present invention is not limited to these embodiments, but various variations and modifications may be made without departing from the scope of the present invention.

The present application is based on and claims the benefit of priority of Japanese Priority Application No. 2013-064086 filed on Mar. 26, 2013, with the Japanese Patent Office, the entire contents of which are hereby incorporated by reference.

What is claimed is:

1. A display terminal, comprising:
an image control unit that controls an operation of capturing a picture image from an imaging angle;
an image unit that captures the picture image, and is controlled by the image control unit;
a detection control unit that detects a change in the imaging angle; and
a display control unit that causes a display to display a display image generated based on the captured picture image, and to display a predetermined image different from the captured picture image when the detection control unit detects the change in the imaging angle, wherein when the detection control unit detects the change in the imaging angle, the image unit outputs the predetermined image for a predetermined time, and the display displays the predetermined image for the predetermined time, and the display control unit measures a switching time required for displaying a picture image captured after the imaging angle is changed, and the image unit uses the switching time measured by the display control unit as the predetermined time.

2. The display terminal as claimed in claim 1, wherein when the detection control unit detects the change in the imaging angle, the image control unit outputs the predetermined image to the display control unit, and the display control unit controls an operation of displaying the predetermined image.

3. The display terminal as claimed in claim 1, wherein the picture image includes at least one of a still picture, a moving picture, and a video picture, and the display image includes at least one of a still picture, a moving picture, and a video picture.

4. An image display system, comprising:
a plurality of the display terminals, each as claimed in claim 1, wherein each of the display terminals sends and receives bidirectionally the captured picture image by wire or wirelessly.

5. An image processing method, comprising:
capturing, by an image unit, a picture image from an imaging angle;
detecting a change in the imaging angle; and
displaying a display image generated based on the captured picture image, and displaying a predetermined image different from the captured picture image when the change in the imaging angle is detected, wherein when the change in the imaging angle is detected, the image unit outputs the predetermined image for a predetermined time, and the display displays the predetermined image for the predetermined time, and the method further comprises measuring a switching time required for displaying a picture image captured after the imaging angle is changed, wherein the measured image unit uses the measured switching time as the predetermined time.

6. The method of claim 5, further comprising:
imaging, using a plurality of display terminals, a plurality of picture images of a plurality of imaging angles, respectively;
detecting, using the display terminals, whether the imaging angles are changed; and
sending and receiving bidirectionally the captured picture images by wire or wirelessly, and displaying the captured picture images.

7. A non-transitory computer-readable storage medium storing a program for causing a computer to perform a process of displaying a captured picture image, the process comprising:
capturing, by an image unit, the picture image from an imaging angle;
detecting a change in the imaging angle; and
displaying a display image generated based on the captured picture image, and displaying a predetermined image different from the captured picture image when the change in the imaging angle is detected, wherein when the change in the imaging angle is detected, the image unit outputs the predetermined image for a predetermined time, and the display displays the predetermined image for the predetermined time, and the process further comprises measuring a switching time required for displaying a picture image captured after the imaging angle is changed, wherein the image unit uses the measured switching time as the predetermined time.

8. The method of claim 5, further comprising:
correcting the display image; and
displaying the corrected display image after displaying the predetermined image.

* * * * *